May 9, 1933.  F. I. WILLIAMS  1,908,392
DUMPING RECEPTACLE
Filed Nov. 21, 1930
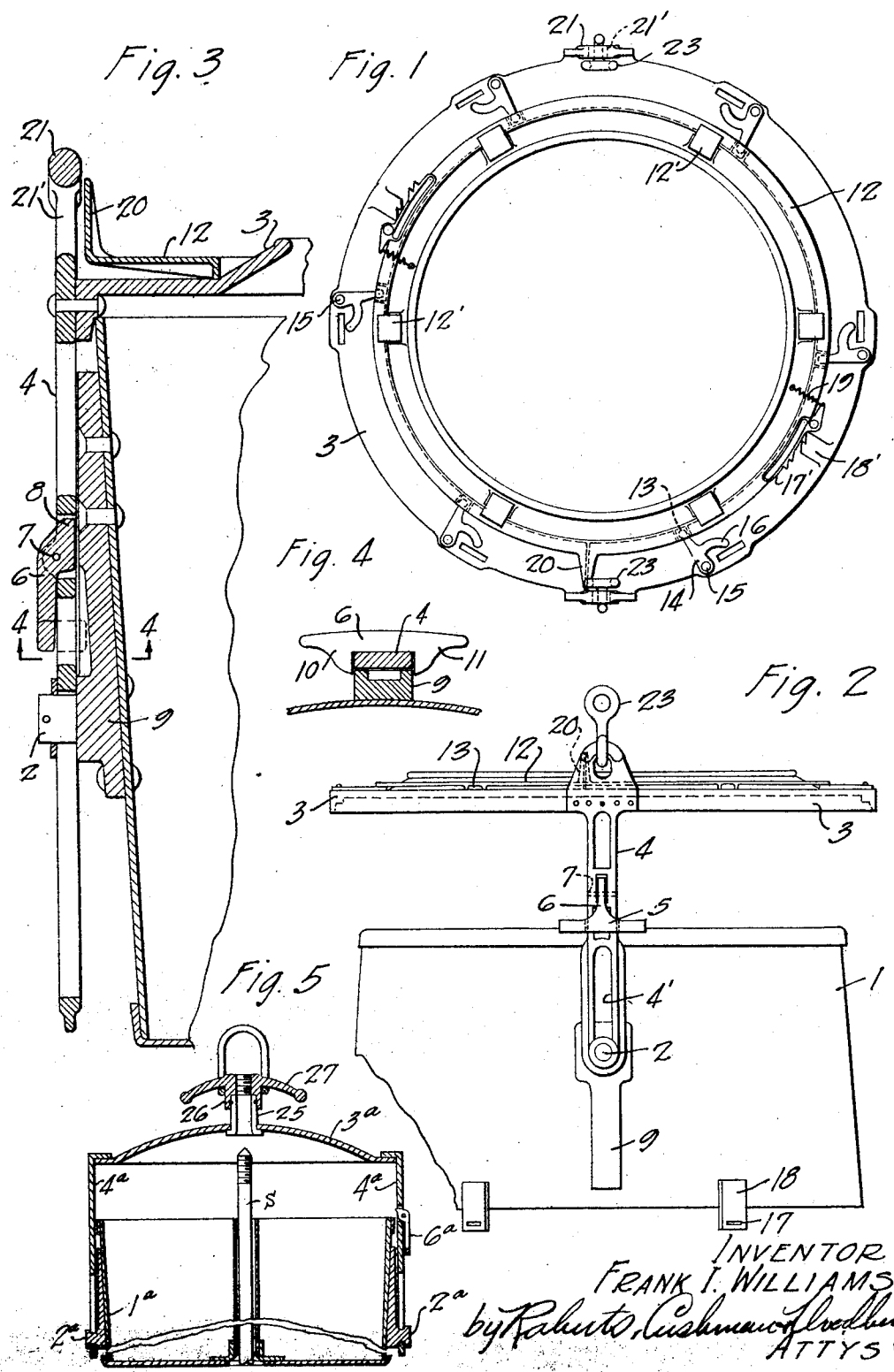
INVENTOR
FRANK I. WILLIAMS
by Roberts, Cushman & Woodbury
ATTYS Patented May 9, 1933

1,908,392

UNITED STATES PATENT OFFICE

FRANK I. WILLIAMS, OF HYDE PARK, MASSACHUSETTS, ASSIGNOR TO AMERICAN TOOL AND MACHINE COMPANY, OF HYDE PARK, MASSACHUSETTS, A CORPORATION OF MASSACHUSETTS

DUMPING RECEPTACLE

Application filed November 21, 1930. Serial No. 497,177.

This invention pertains to dumping receptacles, and more particularly to receptacles which are dumped by inversion. Certain types of apparatus make use of large and heavy receptacles in which material is mixed, dried, or otherwise processed or treated and from which the material must be discharged at the completion of the treating operation, often necessitating transfer of the receptacle with its contents from the treating point to a more or less remote dumping position before unloading. Thus, certain types of centrifugal driers employ receptacles or baskets of large capacity which are whirled to discharge moisture from the material, for example, laundry goods disposed within the basket, the basket thereafter being lifted bodily from the machine and the basket whirling devices and moved to a convenient dumping position.

In the prior practice, dumping baskets have been of two general types: The first type has a bottom which is designed for removal to permit the material inside the basket to fall out. Objections to this lie in the insecurity of an adequate latching device, danger to the operator from the swinging door, and the liability of goods catching on the edges of the basket necessitating the operator's crawling under the basket to remove them. The second type is provided with trunnions on which it may swing to invert it for dumping, and usually has either a removable closure, which must be lifted to one side before dumping, or else has a fixed annular ring on its edge which does not permit goods readily to drop out of the basket.

According to my invention I provide a dumping receptacle which is provided with a semi-removable cover member, by which term I intend to include any form of closure including an annular cover or ring, so connected to the basket as to permit inversion of the basket, without any corresponding movement of the cover. I find it desirable to provide a locking means to hold the cover and basket together to prevent separation thereof while the basket is in operation, but to permit ready separation when the basket is to be dumped. In my preferred construction I provide a latch device supported by the connection between the basket and cover, whereby the basket will be held in upright position during transfer to dumping position, but which is releasable to permit dumping the contents of the basket when the basket is removed from the cover a distance sufficient to permit inversion of the basket without contact with the cover.

In the drawing:

Fig. 1 is a top view of my improved basket;

Fig. 2 is a side elevation showing the basket completely inverted for dumping;

Fig. 3 is a fragmentary vertical section to larger scale, on the line 3—3 of Fig. 1;

Fig. 4 is a fragmentary horizontal section on line 4—4 of Fig. 3; and

Fig. 5 is a vertical section illustrating a modified construction, the cover being shown as lifted.

In my preferred construction I provide a receptacle comprising a basket proper 1 having diametrically disposed trunnions 2 and an annular cover or ring 3. Links 4 are securely attached at opposite edges, respectively of the cover, said links having vertical slots 4' which receive the trunnions 2.

On one of the links 4 I provide a latch device to prevent the basket from tipping until it reaches the desired dumping position. This latch comprises a handle member 5 on one end of a lever 6 which is pivoted to the link at 7. The end 8 of the lever engages a part of the trunnion supporting bracket 9 or other convenient part of the basket and prevents operation of the lever until the latch has reached a position above the top of the part 9. The engagement of the end 8 of the lever with the part 9 prevents unlatching, due to centrifugal force, while the basket is being whirled, and also prevents manual operation of the lever 6 until the basket is in a position for dumping. The handle portion 5 has lugs 10 and 11 projecting inwardly so as to engage the lateral edges of the trunnion support 9, said edges being parallel and smooth to permit sliding engagement of the lugs therewith. These lugs have beveled edges so that the basket may return to its upright position without manual operation of the latch.

To prevent the annular cover or ring 3 from being removed inadvertently during operation of the basket, I provide locking means, shown in Fig. 1. This comprises a light annular ring 12 which is rotatable on the top 3 and held in place by a plurality of lugs 12' and which is provided with notches 13, each engaging one end of a latch 14,—each latch being pivoted as at 15 to the annular ring 3. A projection 16 on each latch normally engages a hole 17 (Fig. 2) in a locking lug 18 projecting up from the upper edge of the basket proper. Preferably several of these locking devices are provided at evenly spaced points to provide secure locking. The several latches are simultaneously operated by rotary movement of the single actuating ring 12. To prevent accidental unlatching, I provide one or more toothed levers 17' pivotally secured to ring 12 and normally cooperating with projections on corresponding lugs 18' on the basket top, the teeth of bars 17' normally being held in engagement with these projections by centrifugal force and the springs 19. The long ends of the levers 17' are in the form of elongate loops and constitute handles by means of which the ring 12 may be moved whereby simultaneously to actuate the latches 14.

The basket is provided with upwardly projecting ears 21 having openings 21' for the reception of hooks or other lifting devices. In order to prevent accidents and to insure that the cover or ring is either wholly locked or unlocked with reference to the basket, projections 20 are arranged on the ring 12 so as to obstruct the openings 21 when the basket and cover are not totally locked or unlocked, thereby to prevent insertion of the lifting hooks 23 (Fig. 2) or equivalent element into the hole 21'. The member 20 is arranged to cover the hole except when the latches are completely locked or completely open, the cover being shown unlocked in Fig. 1.

In order to permit vertical separation of the cover or ring from the basket to permit dumping, the slots 4' in which the trunnions 2 of the basket slide are of a length to permit the removable cover or ring to engage with the top edge of the basket when the trunnion is at the top end of the slot, and to permit the cover and basket to separate vertically to allow the basket to rotate about the trunnion 2 without coming in contact with the cover. In the construction shown, the cover or ring has a large central opening to permit the rim of the basket to swing without interference as it tips, thus avoiding the use of extremely long link members. The links may be made longer however in case it is desirable to have a solid cover on the basket. To insure tipping of the basket when in a position for dumping, the trunnions 2 are mounted below the center of gravity of the loaded basket, so that the basket is self-dumping when the latch 5 is operated.

When it is desired to empty a load from the basket, the ring 12 is moved in a direction to release the latches 14, that is, to the position shown in Fig. 1. This moves the lug 20 past the opening 21 and permits insertion of hooks 23 or other lifting means. To rotate the ring 12, it is necessary first to disengage the teeth from the projections on the lug 18' which is effected by movement of the levers 17'. As the lifting device is elevated, it first raises the ring 12 relatively to the basket, the trunnions moving relatively downwardly in slots 4' until they reach the lower ends of the slots. When the trunnions reach the bottom of the slots, the basket is raised with the ring 12 and the parts carried by the latter and is then carried to the desired dumping place. The operator then pulls out on the handle 5, disengaging the lugs 10 and 11 from the edges of support 9, and the basket tips over, the support 9 preventing disengagement of the lugs until the basket is at the base of the slots and ready for dumping. Unlocking by centrifugal force is also prevented during whirling of the basket by the arrangement of the member 9 and the lever 8. When the basket is empty it is readily relocked, the beveled sides of the projecting lugs 10 and 11 causing the latch lever 6 to swing out as the basket is restored to upright position. The top is then lowered again into contact with the basket and latched in place by rotary movement of the ring 12, the hooks 23 being disengaged to permit this to be done.

By locating the locking lever 6 on one of the links carried by the cover, the operator may readily release the locking means without injury to himself, since it is located so as to remain stationary when the basket is tipped and also in such a location as to be readily accessible.

It will be seen that with this apparatus the locking device 6 can not be released by centrifugal force except when the basket is in dumping position, and the latches 17 which retain the ring 12 in position are so mounted that as the centrifugal force increases, the engagement of the locking means becomes more secure.

The arrangement of the projecting portion 20 of the ring provides a safety device, since the lifting hook can be engaged only when the latches 14 are entirely engaged or entirely disengaged. The basket must accordingly remain in the desired relation to the cover while the hooks 23 are engaged, the basket being either locked to the top in operating position, or unlatched for dumping.

Referring to Fig. 5, which illustrates a modified construction, the basket 1ª is shown as mounted upon the driven spindle S from which it is lifted before dumping. The basket has the cover or guard 3ª which in this case is imperforate, or at least is not of the annular form shown in Fig. 1. This cover has the central hollow boss 25 provided with an axial bore which receives the upper end of the spindle S when the cover is in operative position. A wing nut 26 is rotatably secured to the boss 25 and has handles or wings 27 by means of which it may be turned. This nut has a screw-threaded bore for engagement with the screw-threaded upper end of the spindle S, thereby to clamp or lock the cover in operative engagement with the upper edge of the basket. Links 4ª are secured to the cover 3ª and carry latch levers 6ª similar in purpose and mode of operation to the latch levers 6 previously described. The links 4ª are provided with vertically elongate slots closed at their lower ends for the reception of the trunnions 2ª of the basket.

When the basket 1ª is to be dumped the nut 26 is first disengaged from the spindle S. Lifting devices, for example hooks (not shown), are then engaged with the wings 27 of the nut 26, and the cover with its links 4ª is lifted to the position of Fig. 5. In this position the trunnions 2ª of the basket engage the lower closed ends of the slots in the links 4ª. Further elevation of the cover now lifts the basket off of the spindle S, whereupon the basket may be dumped by release of the latch lever 6ª. The domed shape of the cover prevents interference of the basket with the cover as the basket is swung, thus functioning in this respect in the same way as the central opening of the ring 3 previously described.

It should be understood that the present disclosure is for the purpose of illustration only and that this invention includes all modifications and equivalents which fall within the scope of the appended claims.

I claim:

1. A device of the character described comprising a dumping receptacle, a cover normally disposed closely adjacent to the top of the receptacle, releasable locking means for holding the cover closely adjacent to the top of the receptacle, connections between the cover and receptacle constructed and arranged to permit separation of said parts to a distance sufficient to allow inversion of the receptacle relative to the cover, and means to prevent inadvertent inversion of the receptacle after its separation from the cover.

2. A device of the class described comprising a dumping receptacle, a cover normally engaging the top of the receptacle, connections between the cover and receptacle constructed and arranged to permit separation of the cover and receptacle to a distance sufficient to allow complete inversion of the receptacle relative to the cover, and a manually releasable device normally preventing inadvertent inversion of the receptacle, said device being incapable of manual release until the cover and receptacle have been separated to such distance.

3. A device of the character described comprising a dumping receptacle having a cover normally disposed closely adjacent to the top of the receptacle, a pair of links secured to the cover, said links having elongate slots therein, trunnions projecting from the receptacle into the slots of the respective links, the slots being of a length such as to permit relative separating movement of the cover and receptacle to a distance sufficient to allow complete inversion of the receptacle relatively to the cover, and locking means for holding said receptacle in upright position, said means being operative to prevent inversion of the receptacle except when the cover and receptacle are separated substantially to such distance.

4. A dumping basket for centrifugal machines, said basket having a removable cover normally disposed closely adjacent to the top edge of the basket, connections between the cover and receptacle constructed and arranged to permit relative separating movement of the receptacle and cover to an extent sufficient to allow complete inversion of the receptacle, latch means normally preventing such inversion, and means to prevent release of said latch means by centrifugal action during rotation of the basket.

5. In a device of the character described, a dumping basket, a cover therefor, locking means holding the cover to the basket, means to which a lifting element may be attached, and means constructed and arranged to present attachment of such lifting element except when the locking means is fully locked or unlocked.

6. In a device of the character described, a dumping basket, a cover therefor, locking means holding the cover to the basket, means on the cover to which a lifting element may be attached, and means which prevent attachment of the lifting element except when the locking means is fully locked or unlocked.

7. In a device of the character described, a dumping basket, a cover therefor, locking means holding the cover to the basket, means on the cover to which a lifting element may be attached, a ring for operating the locking means, and a part carried by the ring which prevents attachment of the lifting element except when the locking means is fully locked or unlocked.

8. In a device of the character described, a dumping basket, a top for said basket, links attached to the top, said links having vertical slots, trunnion bearings on the basket engaging the slots, said bearings being below the center of gravity of the basket when filled with material, and latch means carried by one at least of said links for holding said basket in upright position, said latch means being operable to permit inversion of the basket only when the basket is in dumping position.

9. In a device of the character described, a dumping basket, a top for said basket, slotted links attached at opposite edges of the top, trunnion bearings on the sides of the basket engaging in the slots in the respective links, said bearings being below the center of gravity of the basket when filled with material and latch means on one at least of the links for holding said basket in upright position, said latch means being operable to permit inversion of the basket only when the trunnions are at the base of the slots and the basket is in a dumping position.

10. In a device of the character described, a dumping basket, a top for said basket, means on the top for connecting a lifting device, links attached at opposite edges of the top and provided with vertically extending slots, trunnion bearings on the sides of the basket and disposed below the center of gravity of the basket when filled with material, said bearings engaging with the slots and providing guiding means for lowering the top for attachment to the basket and raising the top preparatory to dumping the basket, and latch means on the links for holding the basket in upright position, said latch means being operable to permit inversion of the basket only when the top is raised and the basket is in dumping position.

11. A dumping basket for a centrifugal machine, said basket having a removable cover normally disposed closely adjacent to the top edge of the basket, connections between the cover and basket constructed and arranged to permit relative separating movement of the cover and basket to an extent sufficient to permit complete inversion of the basket, latch means normally preventing such inversion, and means substantially at the center of the cover for releasably securing the cover to the basket.

12. A dumping basket for a centrifugal machine, said basket having a removable cover normally disposed closely adjacent to the top edge of the basket, connections between the cover and basket constructed and arranged to permit relative separating movement of the cover and basket to an extent sufficient to permit complete inversion of the basket, latch means normally preventing such inversion, a wing nut at the center of the cover for engagement with a threaded portion of the basket-driving spindle, said nut being adapted to receive lifting means for raising the cover, the cover being domed to prevent interference between it and the basket when the latter is swung.

13. A dumping receptacle having a cover, means in fixed engagement with said cover and in sliding engagement with said receptacle to permit the receptacle to move away from the cover a predetermined distance at which the receptacle is pivotally supported by such means and adapted to be inverted independently of the cover and a latch carried by said means for holding the receptacle in upright position, said latch preventing the inversion of the receptacle until moved away from the cover the predetermined distance.

14. A dumping receptacle having a cover, means in fixed engagement with said cover and in sliding engagement with said receptacle to permit the receptacle to move away from the cover a predetermined distance at which the receptacle is pivotally supported by such means and adapted to be inverted independently of the cover, and a releasable latch carried by said means, said latch guiding the receptacle during its movement away from the cover, and holding the receptacle in upright position, said latch being releasable to permit inversion of the receptacle only when the latter has been moved away from the cover the predetermined distance.

15. A dumping receptacle having a cover, means in fixed engagement with said cover and in sliding engagement with said receptacle to permit the receptacle to move away from the cover a predetermined distance at which the receptacle is pivotally supported by such means and adapted to be inverted independently of the cover, and a latch carried by said means for holding the receptacle in upright position, said latch providing guiding means for the receptacle during its movement away from the cover and preventing its inversion until moved away from the cover the predetermined distance.

16. A dumping receptacle having a cover and trunnions disposed below the center of gravity of the receptacle when filled with material, means in fixed engagement with said cover and in sliding engagement with said trunnions to permit the receptacle to move away from the cover a predetermined distance at which the receptacle is pivotally supported by such means and adapted to be inverted independently of the cover, and a latch carried by said means for holding the receptacle in upright position, said latch providing guiding means for the receptacle during its movement away from the cover, which latch is in engagement with said receptacle during its movement away from the cover and is held thereby in a predetermined position upon said means.

17. A dumping receptacle having a cover and trunnions disposed below the center of gravity of the receptacle when filled with material, means in fixed engagement with said cover and in sliding engagement with said trunnions to permit the receptacle to move away from the cover a predetermined distance at which the receptacle is pivotally supported by such means and adapted to be inverted independently of the cover, and a latch carried by said means for holding the receptacle in upright position, said latch providing guiding means for the receptacle during its movement away from the cover, which latch is manually releasable and in engagement with said receptacle during its movement away from the cover, such engagement preventing the release of the latch until the receptacle has moved away the predetermined distance.

18. A device of the character described comprising a receptacle, a cover normally engaging the top of the receptacle, a releasable locking device for holding the cover in engagement with the receptacle, connections between the cover and receptacle constructed and arranged to permit separation thereof a distance sufficient to allow inversion of the receptacle relative to the cover when said locking device is released, and releasable means for holding the receptacle in upright position, said means being capable of release only upon separation of the cover from the receptacle.

19. In a device of the character described having a basket provided with a removable cover normally engaging the top edge of the basket, and connections between the cover and basket constructed and arranged to permit separation thereof, a releasable locking device for holding the cover in engagement with the basket, a coupling member secured to said cover for the reception of lifting means, a member movable from a position obstructing the reception of said lifting means to a position permitting the reception of said lifting means, and connections between said locking device and obstructing member for simultaneously actuating the former and moving the latter from obstructing position, whereby said coupling member may receive said lifting device only when the cover is locked to the basket.

Signed by me at Hyde Park, Boston, Mass., this 8th day of November, 1930.

FRANK I. WILLIAMS.